United States Patent [19]

Steineman

[11] 4,336,824
[45] Jun. 29, 1982

[54] CARTRIDGE VALVE

[75] Inventor: Robert J. Steineman, West Carrollton, Ohio

[73] Assignee: United Aircraft Products, Inc., Dayton, Ohio

[21] Appl. No.: 154,592

[22] Filed: May 29, 1980

[51] Int. Cl.³ ............................................. F16K 43/00
[52] U.S. Cl. .................................. 137/315; 137/454.5; 137/542
[58] Field of Search .................... 137/315, 454.5, 542, 137/454.6, 454.2

[56] References Cited

U.S. PATENT DOCUMENTS

| 1,739,603 | 12/1929 | McCune | 137/542 |
| 3,272,219 | 9/1966 | Frantz | 137/454.5 X |
| 3,749,122 | 7/1973 | Gold | 137/542 X |
| 3,938,777 | 2/1976 | Foster | 137/454.6 X |

FOREIGN PATENT DOCUMENTS 1021219 12/1957 Fed. Rep. of Germany ... 137/454.5

Primary Examiner—Harold W. Weakley
Attorney, Agent, or Firm—J. E. Beringer

[57] ABSTRACT

A cartridge valve in which parts made separable for convenience of manufacture and for a use of different materials within the same assembly are interconnected for unitary installation and removal.

8 Claims, 4 Drawing Figures

CARTRIDGE VALVE

BACKGROUND OF THE INVENTION

1. Field of the Invention

This invention relates to a cartridge valve, that is to a valve assembly comprising a cartridge housing containing a poppet type or like valve and which may include means forming a valve seat, the parts having a connected relation enabling installation and removal as a unit.

2. Description of the Prior Art

In a conventional cartridge valve, a projected valve housing is a part of a cap body incorporating external screw threads or the like by which the unit is secured within a cavity to control flow through intercommunicating fluid flow passages. An opening in the cap body allows a valve to be introduced into the valve housing and the latter may include a valve seat. Certain disadvantages inhere in this construction, including the need for three seals, one where the cap body enters the housing, a second to surround the valve housing between controlled passages and a third at the location of means to close the opening to the cap body. In addition, the one-piece construction of the cap body, valve housing and valve seat requires that the material of which the part is made be determined by the needed wear and resistance qualities of the most vulnerable portion. Thus, if the valve seat must be made of a relatively strong, wear resistant material because of the frequent contact made therewith by the valve this means that the cap body and entire valve housing must also be made of this same material. From a cost and weight standpoint there are many times when this is undesirable.

Insofar as is known, this problem has in the prior art been neither fully recognized nor adequately dealt with.

SUMMARY OF THE INVENTION

A cartridge valve according to the present invention provides a cap body and a valve housing, the latter incorporating an integral valve seat and containing a relatively reciprocable valve element. The housing and cap body are in a connected but separable relation, obviating the need to insert the valve element through the cap body and accordingly avoiding the necessity for a sealed opening in the cap body. The valve housing with its integral valve seat being a part separate from the cap body, the housing and cap body can each be made from whatever material is appropriate to its functions in the unit and which is desirable from cost and weight standpoints. A connector in the form of a resilient C-shaped ring provides for positive interconnection of the parts with quick and easy release and re-connection. The arrangement enables the valve housing to be made to greater and lesser lengths as may be desirable for structural or cost reasons.

An object of the invention is to provide a cartridge valve substantially as set forth.

Other objects and structural details of the invention will appear more clearly from the following description, when read in conjunction with the accompanying drawings, wherein.

DESCRIPTION OF FIRST EMBODIMENT

Figure 1:
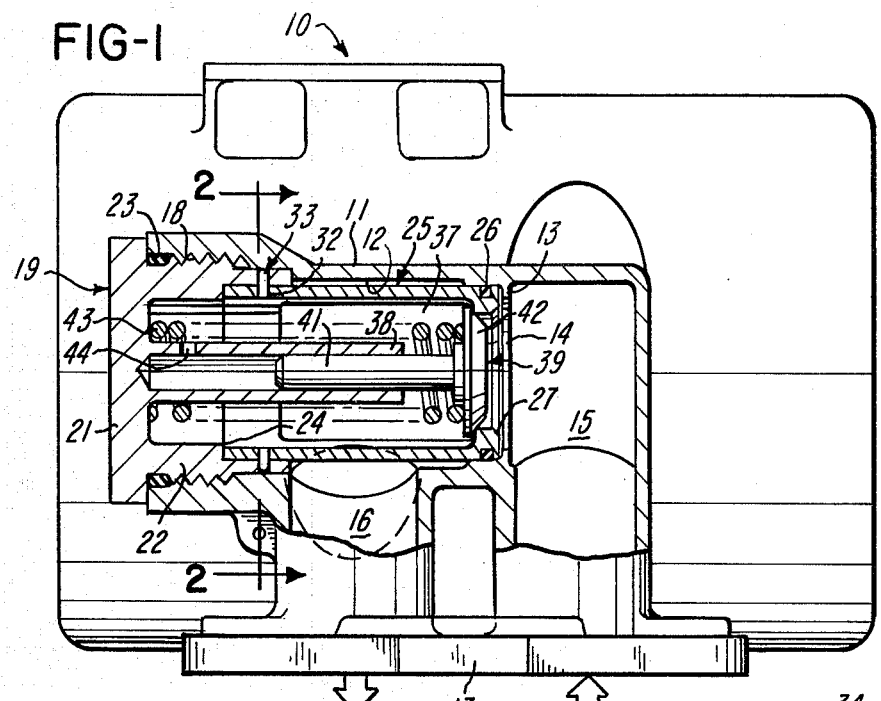
FIG. 1 is a view in longitudinal section of a cartridge valve in accordance with a first illustrated invention embodiment, the valve being shown in a installed position.
Figure 2:
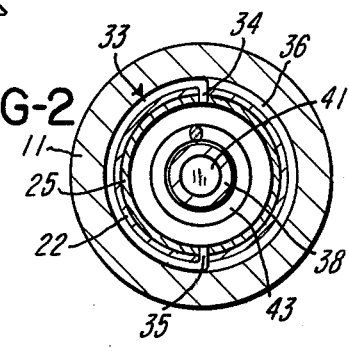
FIG. 2 is a view in cross section, taken substantially along the line 2—2 of FIG. 1.
Figure 3:
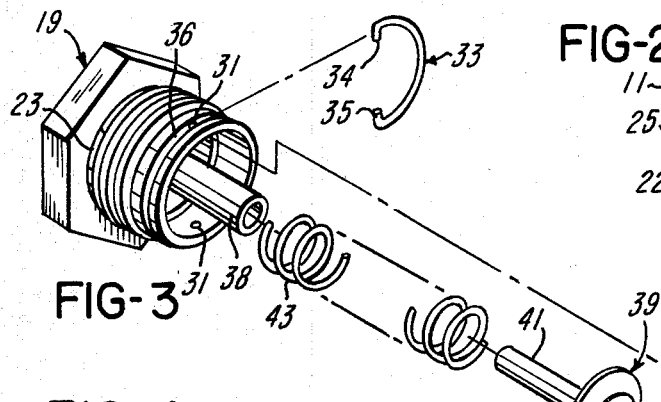
FIG. 3 is an exploded view, in perspective, of a cartridge valve in accordance with the FIG. 1 embodiment.

Referring to FIGS. 1 to 3, a cartridge valve as shown is adapted for installation in a casting or like body 10. In the body 10, a formation 11 provides a cylindrical recess 12 terminating at an inner end thereof at a body wall 13 in which is an opening 14. The latter intercommunicates a pair of spaced apart fluid flow passages 15 and 16 which open separately through a mounting flange 17. Recess 12 at its opposite or outer end terminates in an expanded open chamber 18.

The cartridge valve controls fluid flow through opening 14 or between passages 15 and 16. It includes a cap member 19 having a head portion 21 and a cylindrical projecting portion 22. The latter is of lesser cross sectional dimension than head portion 21 and is adapted to be received in expanded chamber 18 while the head portion is adapted to abut or to limit against that part of formation 11 which surrounds and defines the expanded chamber. Mating complementary surfaces on the wall of chamber 18 and on the exterior of cylindrical portion 18 are threaded so that cap 19 may be screwed into formation 11 and seat thereto substantially as shown in FIG. 1. A seal 23 is compressed in conjunction with installation of the cap and prevents an escape of pressure fluid outwardly of recess 12 around the cap member 19.

A projected extremity of cylindrical portion 22 is reduced in thickness to define an interior shoulder 24. A valve sleeve or housing 25 is a cylindrical member acting as a longitudinal extension of portion 22. An inner end thereof has a telescopic fit in portion 22 and seats to shoulder 24. The sleeve 25 is relatively elongated and its opposite end approaches but is slightly spaced from body wall 13. Adjacent such outer or opposite end the sleeve has an exterior groove containing a seal 26 and an internal formation 27 defining a circular valve seat. Seal 26 effectively denies flow between passages 15 and 16 around the valve sleeve, limiting such flow to that as may be allowed to take place through the open area bounded by valve seat 27, as in the illustrated instance from passage 15 through the valve seat into the interior of sleeve 25. Between its ends, the sleeve has openings 28 and 29 so that fluid can flow readily from the interior of the sleeve to passage 16.

In the projecting cylindrical portion 22 of cap member 19 is a pair of diametrically opposed radial apertures 31. Similarly formed and similarly orienting apertures 32 are in that end portion of sleeve 25 in telescoping relation with portion 22. The longitudinal position of the set of apertures 32 is such that when the sleeve 25 is seated to shoulder 24, sets of apertures 31 and 32 are in a common transverse plane. They may be aligned by an appropriate relative rotary adjustment of the telescoping parts. A connector 33 releasably uniting the cap and sleeve members is made of spring wire or the like and is formed to an approximate C-shape with bent over extremities 34 and 35. The extremities are of a size to enter apertures 31–32 and are in an opposed relation to one another, the body of the connector flexing to allow the extremities toward and away from one another. In the exterior of cylindrical portion 22 in the same transverse plane as apertures 31 is a peripheral groove 36. As will be understood, connector 33 has characteristics of a snap ring and as applied to groove 36 has its extremities 34–35 spread apart until they reach apertures 31 whereupon they snap into these apertures. In the presence of part 25 and aligned apertures 32, the C-ring extremities will also enter these apertures and thereby hold the cap member and valve sleeve in a connected relation. To release the parts for separation, the connector is simply manually expanded, disengaging the extremities 34–35, at least from apertures 32. The connector tends to be recessed in groove 36, and, in an installed position of the valve, is confined in a locking position by the surrounding wall of the body in which the valve is accommodated.

Cap member 19 and sleeve 25 define an interior space 37 communicating through valve seat 27 with passage 15 and through sleeve openings 28–29 with passage 16. A valve guide 38 projects into space 37 from cap member 19, being in the illustrated instance of FIGS. 1–3 formed integrally with the cap member. A valve 39 has a stem 41 slidable in guide 38, and, beyond the valve guide a head 42. The latter, as indicated, is adapted to engage within seat 27 denying flow through the valve seat. A compression spring 43, based on cap member 19, urges the valve to a seated or closed position. As will be understood, valve 39 is a pressure responsive device held normally closed by spring 43 and yielding to a predetermined high pressure differential between passages 15 and 16 to allow fluid flow to take place from passage 15 to passage 16. A vent 44 in valve guide 38 obviates entrapment of fluid therein.

C-shaped ring 33, as noted, releasably locks component parts of the cartridge valve into a unitary assembly. At the same time, selectivity may be used in choosing the materials of which parts are made. For example, the relatively massive cap member 19 may be made of a lightweight aluminum or the like, while sleeve 25 and its incorporated valve seat is made of a hardened steel or the like for better wear resistance. Cap member 19 need not be screw threaded into the mounting body. Bolts, retaining rings or the like may be used for its retention. Two only seals are required in installation of the valve since valve member 39 is fully contained within the valve unit.

DESCRIPTION OF SECOND EMBODIMENT

Figure 4:
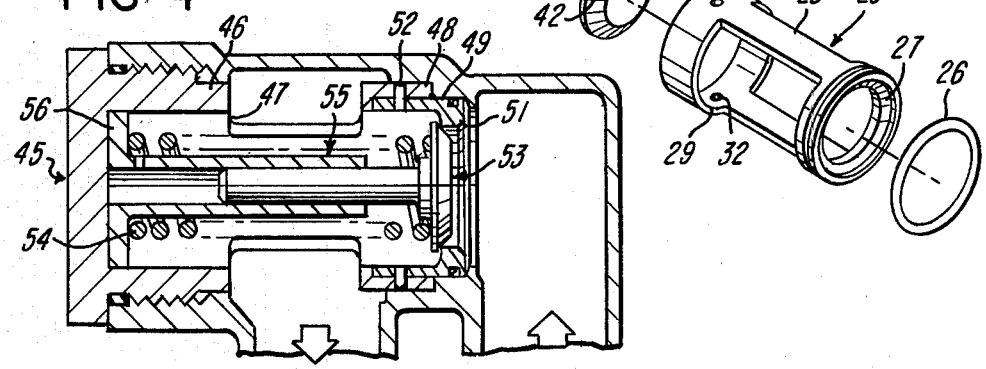
FIG. 4 is a view like FIG. 1, showing an alternate form of the invention.

In the invention embodiment shown in FIG. 4, a cap member 45 has an elongate cylindrical portion 46 in which are openings 47 corresponding to the openings 28–29 of the first considered embodiment. A reduced diameter extremity 48 receives a valve sleeve 49 incorporating a valve seat 51. A connector 52, corresponding to connector 33, is recessed in extremity 48 and is adapted to engage in aligning apertures in the extremity and in sleeve 49 to maintain a connected relation of the parts, this arrangement being the same as in the FIG. 1–3 embodiment. A valve 53 is like valve 39 and engages seat 51 under the urging of a spring 54. A valve guide 55 is in this illustrated instance a separable member having a flange 56 seated to cap member 45 and providing a base against which spring 54 may react. The flange 56 has a sliding fit in the interior of cylindrical portion 46.

FIG. 4 accordingly demonstrates some modifications that may be made in the first illustrated embodiment without departing from invention concepts. Other such modifications obviously are within the scope of persons skilled in the art.

What is claimed is:

1. A cartridge valve, including a body providing an axially projecting cylindrical portion, a valve housing mounted to said cylindrical portion as an extension thereof, said valve housing being an element separable from said body and having an outer end providing a radially orienting valve seat, detachable means holding said valve housing and said body in a connected relation, said valve housing having a telescopic fit to said cylindrical portion of said body and said detachable holding means taking the form of a spring clip having bent over ends adapted to enter aligning apertures in telescoping members, a valve contained within the assembly comprised of said body and said housing and including a head portion reciprocable within said valve housing, and a spring urging said valve toward an engagement of said head portion thereof with said valve seat, said spring being effectively interposed between said body and said housing.

2. A cartridge valve according to claim 1, said spring clip having an approximate C-shape and being accommodated in a circular groove in an outer one of the telescoping members.

3. A cartridge valve according to claim 2, said body having a shoulder to limit inward axial motion of said housing relative to said body, said circular groove in an outer one of the telescoping members aligning with apertured means in an inner one of the telescoping members when said housing seats to said body.

4. A cartridge valve according to claim 1, and a valve guide based in said body and extending therefrom toward said valve seat, said valve including a stem portion having a sliding mount in said guide and said spring being in a surrounding relation to said guide and bearing at one end on said valve head portion.

5. A cartridge valve according to claim 4, said valve guide being in an attached relation to said body.

6. A cartridge valve according to claim 4, said valve guide being a part having a sliding mount in the projecting cylindrical portion of said body and adapted to seat to said body, said spring being interposed to urge said valve toward said valve seat and to urge said valve guide toward a seat on said body.

7. A cartridge valve as in claim 1, adjacent ends of said valve housing and said cylindrical portion of said body overlapping and said spring clip being installed in and removed from said overlapping ends as an element separate from said body and valve housing, said valve housing being elongated relative to said cylindrical portion of said body.

8. A cartridge valve as in claim 1, adjacent ends of said valve housing and said cylindrical portion of said body overlapping and said spring clip being installed in and removed from said overlapping ends as an element separate from said body and valve housing, said cylindrical portion of said valve body being elongated relative to said valve housing.

* * * * *